(12) United States Patent
Jia et al.

(10) Patent No.: US 8,075,645 B2
(45) Date of Patent: Dec. 13, 2011

(54) CATALYSTS, SYSTEM AND METHOD FOR HYDROGEN PRODUCTION

(75) Inventors: Zhijun Jia, La Crosse, WI (US); Mark Wood, Perton (GB); Clay Thiele, La Crosse, WI (US)

(73) Assignee: Chart Inc., Garfield Heights, OH (US)

( * ) Notice: Subject to any disclaimer, the term of this patent is extended or adjusted under 35 U.S.C. 154(b) by 427 days.

(21) Appl. No.: 12/384,796

(22) Filed: Apr. 8, 2009

(65) Prior Publication Data
US 2009/0257928 A1    Oct. 15, 2009

Related U.S. Application Data

(60) Provisional application No. 61/043,304, filed on Apr. 8, 2008.

(51) Int. Cl.
*B01J 7/00*     (2006.01)
*C10B 1/00*     (2006.01)
*C10J 3/48*     (2006.01)

(52) U.S. Cl. .................. 48/61; 48/89; 48/101; 48/119

(58) Field of Classification Search .............. 48/61, 89, 48/101, 119
See application file for complete search history.

(56) References Cited

U.S. PATENT DOCUMENTS

| 6,510,894 B1 | 1/2003 | Watton et al. |
| 6,695,044 B1 | 2/2004 | Symonds |
| 7,789,920 B2 * | 9/2010 | Jia et al. ............................ 48/61 |

* cited by examiner

*Primary Examiner* — Timothy Vanoy
(74) *Attorney, Agent, or Firm* — Fanelli Haag PLLC

(57) ABSTRACT

A system for producing hydrogen features a reactor including a reaction channel adapted to receive a reaction stream including a mixture of supercritical water and a hydrocarbon fuel. A catalyst is positioned in the reaction channel so that a product stream containing hydrogen is produced by a reaction in the reaction channel when the mixture is exposed to the catalyst; wherein the catalyst contains a catalytically active metal and a promoter in a metal format, selected from the group consisting of potassium, sodium, rubidium, lithium, cesium, beryllium, magnesium, calcium, strontium, and barium.

30 Claims, 5 Drawing Sheets

US 8,075,645 B2

CATALYSTS, SYSTEM AND METHOD FOR HYDROGEN PRODUCTION

CLAIM OF PRIORITY

This application claims priority from U.S. Provisional Patent Application Ser. No. 61/043,304, filed Apr. 8, 2008, currently pending.

TECHNICAL FIELD

The present invention relates generally to hydrogen production and, more particularly, to catalysts for use in reactors, systems and methods for generating hydrogen from supercritical water and hydrogen sources.

BACKGROUND

Hydrogen is required as an input for a variety of processes and various technologies. Examples of such processes and technologies include hydrogenation, ammonia synthesis and fuel cells.

Water is the most prevalent substance from which hydrogen may be obtained. Methane steam reforming (MSR) and naphtha steam reforming (NSR) are the most common prior art technologies economically operable and commercially available for obtaining hydrogen from water. The MSR and NSR processes, each of which require a source of methane or natural gas, are costly and complex. For both MSR and NSR, thermal control at high temperatures (such as above 800° C.) and catalyst deactivation are both technically difficult areas. A need therefore exists for an economical system and method whereby hydrogen may be obtained from water using a process other than the MSR or NSR processes.

Electrochemical extraction of energy from hydrogen via fuel cells is an especially clean and efficient method of providing power. As a result, fuel cell development is very active for various applications. An example of such an application is powering automobiles. Governmental requirements regarding the maximum allowable harmful fuel emissions for vehicles in the United States are forcing vehicle manufacturers to design vehicles that run on fuels other than gasoline and diesel fuel or consider alternative types of engines, such as electric engines. This has led to the design of vehicles that use fuel cells that run on pure hydrogen. When pure hydrogen is mixed with oxygen via a fuel cell in the vehicle, water, heat and electricity are produced, ideally without emitting other chemicals that are harmful to the air or the environment.

In addition, a fuel cell system running on hydrogen can be compact, lightweight and has no major moving parts. Because fuel cells have no moving parts, in ideal conditions they can achieve a very high reliability with minimal downtime. As a result, fuel cells are also very useful as power sources in remote locations, such as spacecraft, remote weather stations, large parks, rural locations and in certain military applications.

Current fuel cell technology requires high purity hydrogen for successful operation. The government has directed that fuel cell vehicles rely on stationary hydrogen dispensing stations for fueling, yet there is no established infrastructure for hydrogen distribution. Furthermore, many technical difficulties have been encountered during attempts to develop an on-board hydrogen generation system for other mobile applications. As a result, a need exists for a simple, lightweight and compact hydrogen generation system and process that may be used either on-board a mobile vehicle or in a stationary facility.

Main hydrogen applications also exist in the petrochemical industry, ammonia synthesis, methanol (or dimethyl ether) synthesis and hydrogenation processes.

DETAILED DESCRIPTION

In accordance with the present invention, a supercritical process and a reactor may be used along with catalysts for processing a mixture of supercritical water and a hydrocarbon fuel to generate hydrogen. Separation of the generated hydrogen is preferably accomplished in the reactor by a membrane, such as palladium, vanadium, copper or alloys thereof (an alloy is a homogenous mixture of two or more elements at least one of which is a metal and the resulting material has metallic properties) or a polymer. Alternatively, the separation may be performed by a separator device separate from the reactor which may use either a membrane or a pressure swing adsorption (PSA) process for the hydrogen collection.

Figure 1:
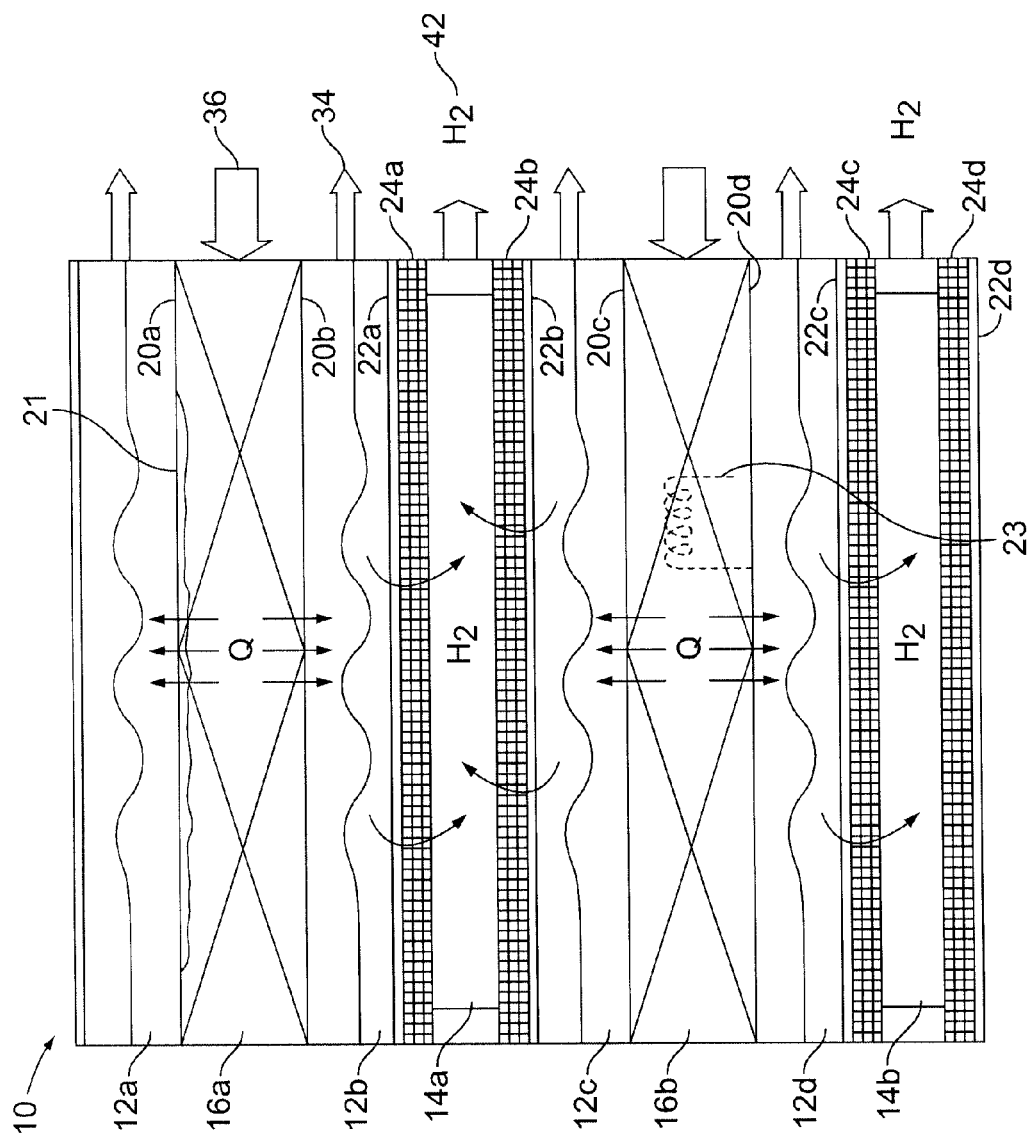
FIG. 1 is a schematic illustrating the interior of a compact reactor suitable for use with the catalysts and method of the present invention.

A schematic view of a portion of an embodiment of the reactor is indicated in general at 10 in FIG. 1. As illustrated in FIG. 1, the reactor features a number of reaction channels 12a-12d. While four reaction channels are illustrated in FIG. 1, the reactor may have more or may have a lesser number of reaction channels or even one reaction channel. Each reaction channel is bounded on one side by a hydrogen channel, 14a and 14b, and on the other side by a combustion or heating stream channel, 16a and 16b. Each reaction channel and heating stream channel are separated by a heat transfer sheet 20a-20d, preferably constructed of metal, upon which a dehydrogenation catalyst, such as nickel, platinum, ruthenium, rhodium, copper or other noble metal or alloys thereof, is coated on the reaction side. Each reaction channel and hydrogen channel are separated by a membrane containing palladium, vanadium or a polymer 22a-22d mounted on a porous support plate 24a-24d on the reaction side.

The heating stream channel may provide heat to the reaction channel by heat transfer from a hot gas stream flowing through the heating stream channel. Alternatively, as will be explained in greater detail below, combustion catalysts may be optionally packed or coated in the heating stream channel, as illustrated at 21 in FIG. 1 for heating stream channel 16a, so that a combustion reaction occurs in the heating stream channel. The heat produced by the combustion reaction heats the reaction channel. A third option is to heat a fluid flowing through the heating stream channel by placing an auxiliary electric heating arrangement in the heating stream channel, such as the resistance element illustrated in phantom at 23 in FIG. 1 for heating stream channel 16b.

A reaction stream passes through each reaction channel where the coated catalysts are used. The reaction stream inlet portion for the reactor consist of a mixture of supercritical water and a hydrocarbon fuel. The critical point for water is a temperature of 374° C. at a pressure of 221 bars, which is therefore the minimum temperature and pressure for the reaction stream inlet portion. On the other side of each reaction channel the membrane, supported by the porous material, is applied to extract hydrogen from the reaction stream. The hydrogen generated in each reaction channel permeates through the membrane and then is collected in one of the hydrogen channels at the other side of the membrane. Membranes containing palladium or vanadium have a unique property of exclusively allowing hydrogen to permeate through their structures while other gases have molecules that are too large to pass through the membrane. High purity hydrogen can be collected on the other side of the membrane while the other gases are recycled or collected separately after the reaction from the outlet of the reaction channels.

As illustrated in FIG. 1, a heating stream, which may include steam, inert gas or liquid, flows through each heating stream channel and provides heat (Q) to the reaction channels for the supercritical process. If a combustion catalyst is coated, packed or otherwise present in the heating stream channel, a mixture of air or oxygen mixed with a hydrocarbon may serve as the heating stream inlet so that combustion occurs in the heating stream channel and provides the heat Q to the reaction channels.

Figure 2:
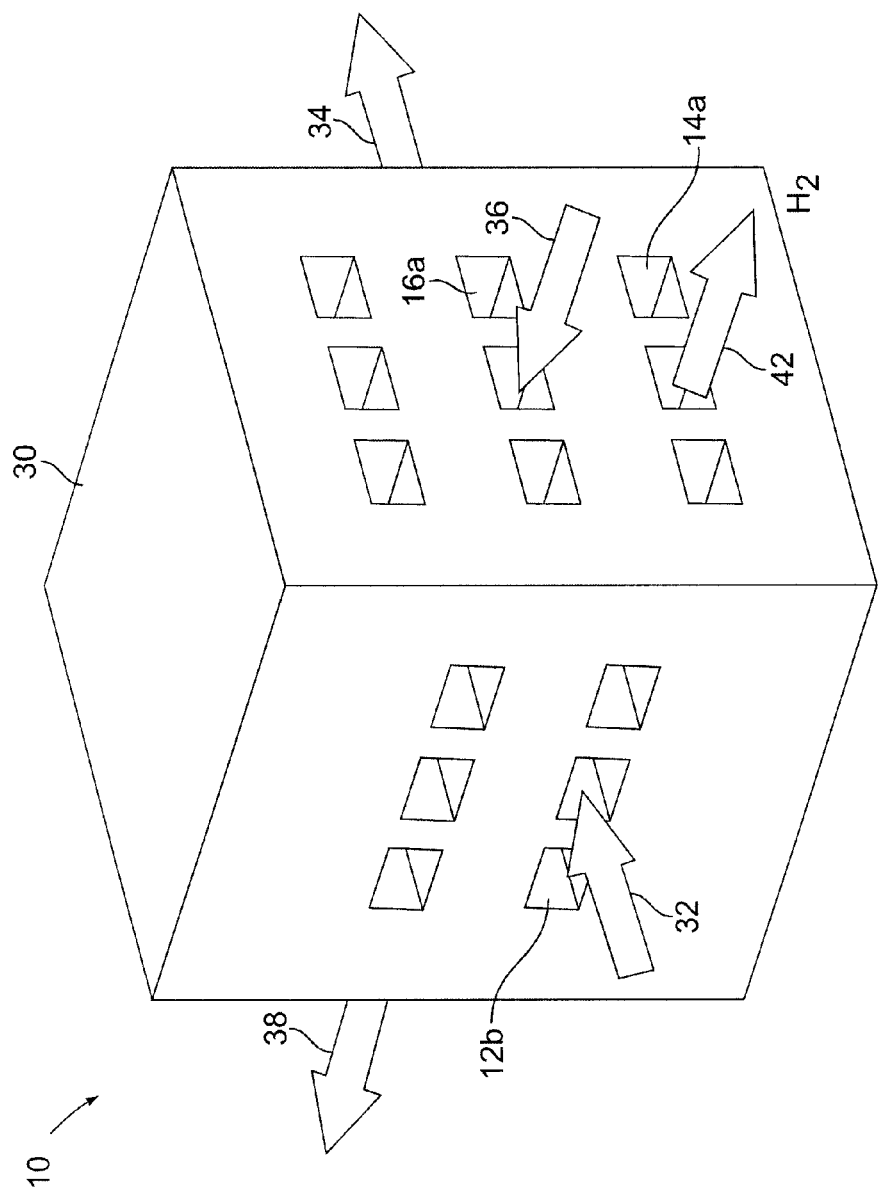
FIG. 2 is a schematic illustrating a portion of the exterior of the compact reactor of FIG. 1.

A simplified illustration of a portion of the exterior of the reactor 10 of FIG. 1 without pipes, headers or manifolds is illustrated in FIG. 2. The reactor features a housing 30 which contains the heating stream channel 16a, reaction channel 12b and hydrogen channel 14a (in addition to the other channels of the reactor, including those illustrated in FIG. 1). While the heating stream, hydrogen and reaction channels are illustrated schematically in FIG. 1 as running in parallel for ease of explanation, the heating stream and hydrogen channels may run perpendicular to, or at any other angle with respect to, the reaction channels. In the embodiment of FIG. 2, the supercritical inlet and outlet portions of the reaction stream are indicated at 32 and 34, respectively (see also FIG. 1 for 34). The inlet and outlet portions of the heating stream are indicated at 36 and 38, respectively (see also FIG. 1 for 36). The hydrogen outlet stream is indicated at 42 in both FIGS. 1 and 2.

In an alternative embodiment, the entire reactor may be placed in a furnace. In such an embodiment, a fuel stream and a stream containing oxygen are input into the furnace for combustion to provide heat for the reaction.

For the situation where combustion catalysts are present in the heating stream channels of the reactor 30, the reaction stream outlet 34 may serve as the heating stream inlet 36, since the reaction stream outlet contains a residual hydrocarbon, or outlet stream after fuel cells contains residual hydrogen.

Suitable reactors for use as the reactor of FIGS. 1 and 2 are known in the art. An example of such a reactor is Chart Industries, Inc.'s SHIMTEC® reactor, which is described in U.S. Pat. Nos. 6,510,894 and 6,695,044, the contents of which are incorporated herein by reference. This compact heat exchange reactor has the capability to perform at the high temperature and high pressure required for a process using supercritical water. Moreover, it provides abundant surface area for heat exchange in order to control reaction temperature for increasing the hydrogen production and also abundant membrane surface area for greater hydrogen production in a small device.

While the embodiment of FIGS. 1 and 2 feature a catalyst that is a coating or an unsupported catalyst, the catalyst can be installed in various alternative forms such as a fluidized bed or a packed bed catalyst having either a supported or an unsupported catalyst, a wash coated catalyst or incipient wetness impregnated catalyst producing a thin film on one or more walls of the reaction chamber or an electroless plated catalyst. Other deposition methods may also be applied on structures prior to their insertion into the reactor. The catalyst is used to break the carbon-carbon bonds and carbon-hydrogen bonds in the reaction stream.

The catalyst can be from a range of catalytically active metals including, but not limited to, Nickel (Ni), Platinum (Pt), Ruthenium (Ru), Rhodium (Rh), Copper (Cu) or alloys thereof. In addition, in accordance with the present invention, other metals or catalytically active oxides can be used as the catalyst for the processes described herein, including, but not limited to, Neodymium (Nd), Molybdenum (Mo), Chromium (Cr), Manganese (Mn), Vanadium (V), Copper (Cu), Zinc (Zn), Niobium (Nb), Technetium (Tc), Cadmium (Cd), Rhenium (Re), Osmium (s), Iridium (Ir), Mercury (Hg), Tungsten (W), Cobalt (Co), Palladium (Pd), Silver (Ag), Gold (Au) and their combinations or alloys thereof. The catalyst can be either in the metal format or oxides, zeolites and combinations format thereof.

The catalyst can be prepared using conventional methods including, but not limited to precipitation, impregnation, sol-gel, electrolysis, deposition methods and other processes and methods known in the art. In addition, advanced methods including, but not limited to, chemical vacuum deposition, can be used for this catalyst preparation.

In accordance with the invention, a variety of support materials and promoters may be used in combination with the above catalysts. For example, aluminum oxide may be used as a support material. Examples of other support materials include, but are not limited to, magnesium oxide, cerium oxide, zirconium oxide, lanthanum oxide, silicon oxide, neodymium oxide, vanadium oxide and titanium oxide. The support can be constructed from a single material or combinations of the above materials.

Materials that can be applied as promoters include, but not limited to, Potassium (K), Sodium (Na) and Rubidium (Rb), Lithium (Li), Cesium (Cs), Beryllium (Be), Magnesium (Mg), Calcium (Ca), Strontium (Sr), and Barium (Ba). These components can be used individually or in combination as promoters to improve the catalytic properties of the catalyst. For example, Potassium, Sodium and Rubidium can prevent coke formation during the reaction.

In some scenarios, the support material may function as a promoter so that the support material may also be classified as promoter.

Figure 3:
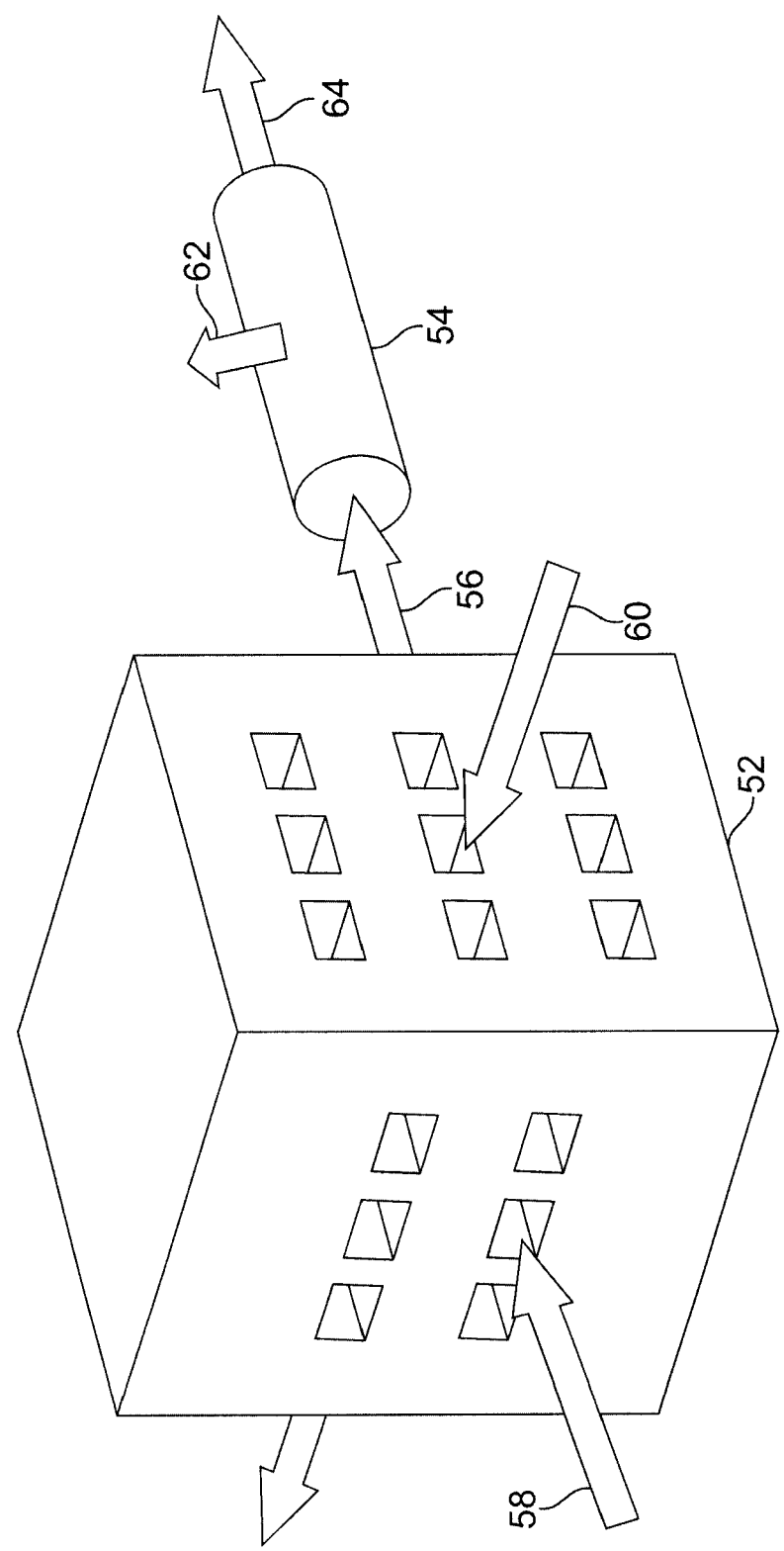
FIG. 3 is a schematic illustrating a compact reactor and a separator suitable for use with the catalysts and method of the present invention.

While FIGS. 1 and 2 illustrate a compact reactor within which hydrogen may be removed from the reaction stream, the removal of hydrogen from the reaction stream may alternatively be accomplished outside of the reactor. The process of separating hydrogen from a stream outside of a reactor is well known and devices are commercially available. For example, as illustrated in FIG. 3, the reaction and separation might be done in two separate devices 52 and 54 connected by a passageway, such as a tube, pipe or conduit to simplify the reactor construction. In such an arrangement, the first device 52 may be a compact reactor, such as the one illustrated in, and described with reference to, FIGS. 1 and 2, but without the membranes 22a-22d and porous plates 24a-24d (FIG. 1) and the hydrogen channels. The reactor 52 is used in a supercritical condition for hydrogen generation while the separator device 54 is used for hydrogen separation from the product stream 56 exiting the first reactor through the passageway connecting the reactor and separator. As with the embodiment of FIGS. 1 and 2, the reaction stream input portion 58 and heating stream channel for the reactor 52 may have temperatures above 374° C. and pressures above 221 bars.

The conditions for the separator 54 depend on the membrane and support materials within the device. For example, if the separator 54 features channels divided by porous metal coated with palladium, as illustrated at 22a-22d and 24a-24d of FIG. 1, operating temperature could be below 374° C., and operating pressure could be below 221 bars for hydrogen separation. The hydrogen stream exiting the separator 54 is illustrated at 62 in FIG. 3, while the residual stream (which corresponds to the reaction stream outlet portion 34 in FIG. 2) is illustrated at 64.

Alternatively, a process swing adsorption (PSA) process may be used by the separator 54 instead of a membrane to separate hydrogen from the product stream 56. The construction of PSA devices is well known in the art. The PSA device 54 separates the hydrogen from the product stream gas 56 under pressure according to the hydrogen's molecular characteristics and affinity for an adsorbent material. The device cycles are to first adsorp hydrogen on the adsorptive material at high pressure and then desorp the hydrogen by lowering the pressure. Hydrogen collection occurs during the low pressure cycle. Using two adsorbent vessels allows near-continuous production of hydrogen. It also permits pressure equalization, where the gas leaving the vessel being depressurized is used to partially pressurize the second vessel. This results in significant energy savings and is a common industrial practice.

As with the embodiment of FIGS. 1 and 2, for the situation where combustion catalysts are present in the heating stream channels of the reactor 52, the residual stream 64 may serve as the heating stream inlet 60, since the residual stream contains a hydrocarbon (as well as residual hydrogen).

Figure 4:
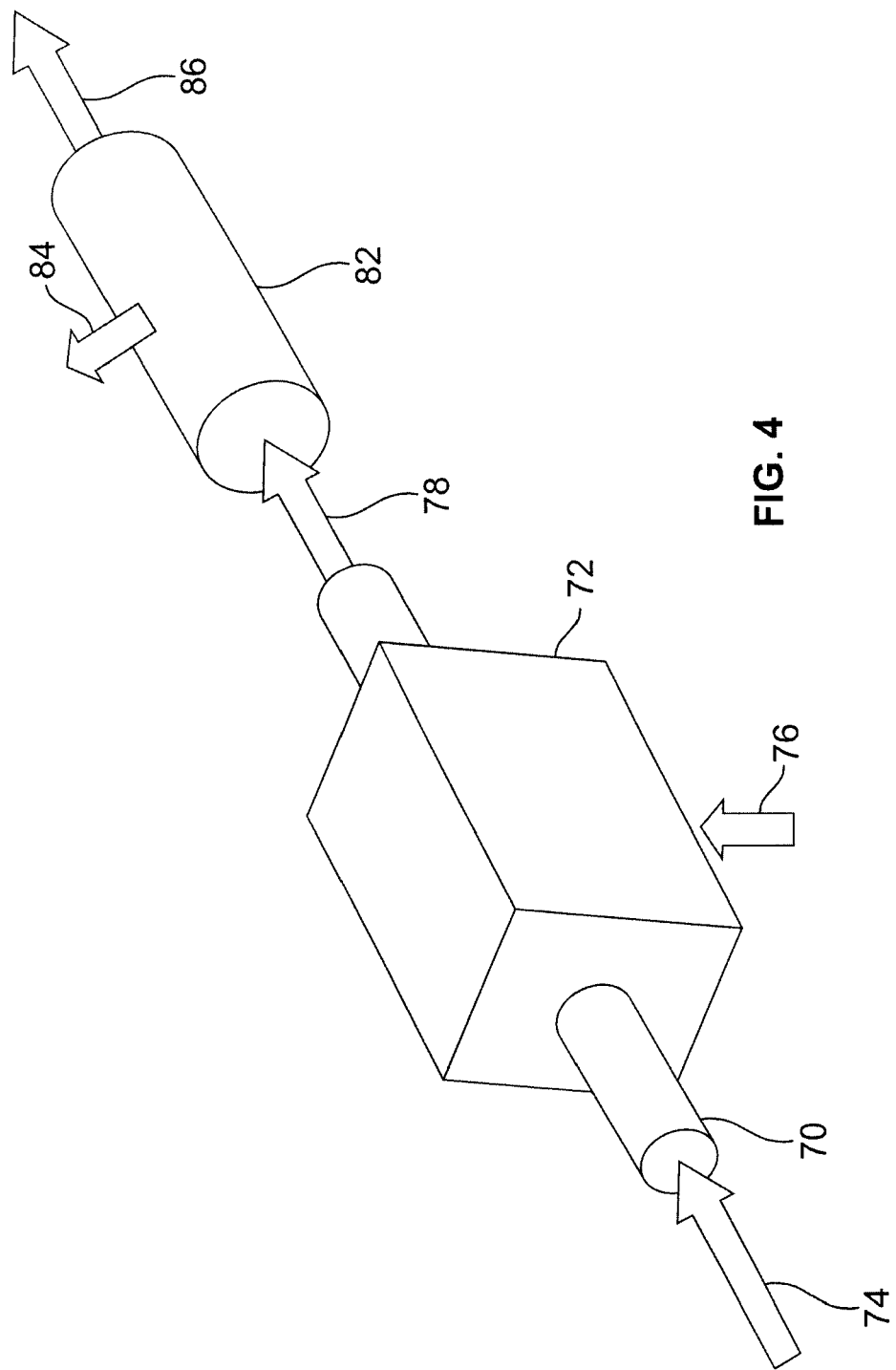
FIG. 4 is a schematic illustrating a tube or channel reactor, a chamber and a separator suitable for use with the catalysts and method of the present invention.

As an alternative to the compact reactor 52 of FIG. 3, a tube or channel reactor 70 could be used, as illustrated in FIG. 4. The tube reactor 70 is placed in a housing 72 that defines an interior chamber. The tube reactor serves as the reaction channel and therefore features a catalyst coating on its interior surfaces or is packed with a catalyst and receives a reaction stream inlet 74. The chamber of housing 72 receives a heating stream 76 whereby heat is provided to the reaction channel in the tube reactor 70. As with the embodiment of FIG. 3, the product stream 78 from the reactor flows through a passageway, such as a tube, pipe or conduit to the separator 82. As with the embodiment of FIG. 3, a hydrogen stream exits the separator 82, as illustrated at 84, while the residual stream (which corresponds to the reaction stream outlet portion 34 in FIG. 2) exits the separator as illustrated at 86. As with the embodiment of FIG. 3, the separator 82 may used either a membrane for the hydrogen separation or a PSA process.

Similar to the embodiments of FIGS. 1-3, for the situation where combustion catalysts are present within the chamber of housing 72, the residual stream 86 may serve as the heating stream inlet 76, since the residual stream contains hydrocarbons (as well as residual hydrogen). Under such conditions, combustion occurs in the chamber of housing 72 to provide heat for the reaction channel of the tube reactor 70.

In all of the systems and methods described above, hydrogen production can be increased by changing the operating conditions of the reactor. For example, increasing the inlet pressure of the reaction stream will increase the driving force for the hydrogen separation. As a result, reactors which are capable of sustaining higher pressures, such as the compact reactors of the embodiments of FIGS. 1-3, will favor more hydrogen production.

It should be noted that an equilibrium shift occurs in the reaction stream favoring hydrogen production. More specifically, as the hydrogen concentration decreases in the reaction stream, the reaction shifts to produce more hydrogen. Also, the removal of the reaction product hydrogen lowers the necessary reaction temperature which increases the range of materials acceptable for the reactor. This results in lower cost, better performance and increased ease of manufacture for the reactor.

The embodiments of FIGS. 1-4 offer a number of unique benefits including the generation of high purity hydrogen efficiently and simply and the generation of a potentially valuable byproduct of high pressure $CO_2$ (present in the reaction stream outlet portion 34 of FIG. 2 or product streams 64 and 86 of FIGS. 3 and 4, respectively). In addition to use as the heating stream for the reactor, the high pressure $CO_2$ produced may be used for power plant or petrochemical complex applications.

The reaction stream inlet portions for the reactors of FIGS. 1-4 consist of a mixture of supercritical water and a hydrocarbon fuel. As mentioned previously, the critical point for water is a temperature of 374° C. at a pressure of 221 bars. Water at these conditions or at a higher temperature and/or a greater pressure (supercritical water) has desirable properties including a change in the capacity to dissolve liquid hydrocarbons. The hydrocarbon fuel may be any hydrocarbon-based fuel such as crude oil, liquid fuels such as jet fuel, diesel and gasoline, natural gas, liquid natural gas, coal, coal dust, saw dust, waste wood and/or biomass material. Other short chain (e.g. <C6) hydrocarbons may also be used in the reaction stream with the water. The temperature can be from 374° C. and up and the pressure from 221 bars and up for both the reaction and heating streams.

The supercritical water has the unique feature of high solubility for most organic liquids, powders or gases. Hydrocarbon fuels, not ordinarily soluble in water, become highly soluble in supercritical water thus permitting the possibility of a reaction between the fuel and water on a catalytic metal based surface, using the catalysts noted above. Reaction conversion reaches 100% and the hydrogen yield can exceed 90%, implying the ability to control the selectivity of the reaction. Details can be seen in the following examples.

Two of the most significant benefits from this supercritical process are that additional hydrogen (for example, more than 60%) comes from water when using fossil fuel as a feed, and $CO_2$ production can be cut significantly (for example, in half) with same amount of hydrogen production compared to current fossil fuel combustion systems.

Two-micron frits are placed at each end of each reaction channel, thus allowing reactants to freely pass through while the catalyst is retained.

Figure 5:
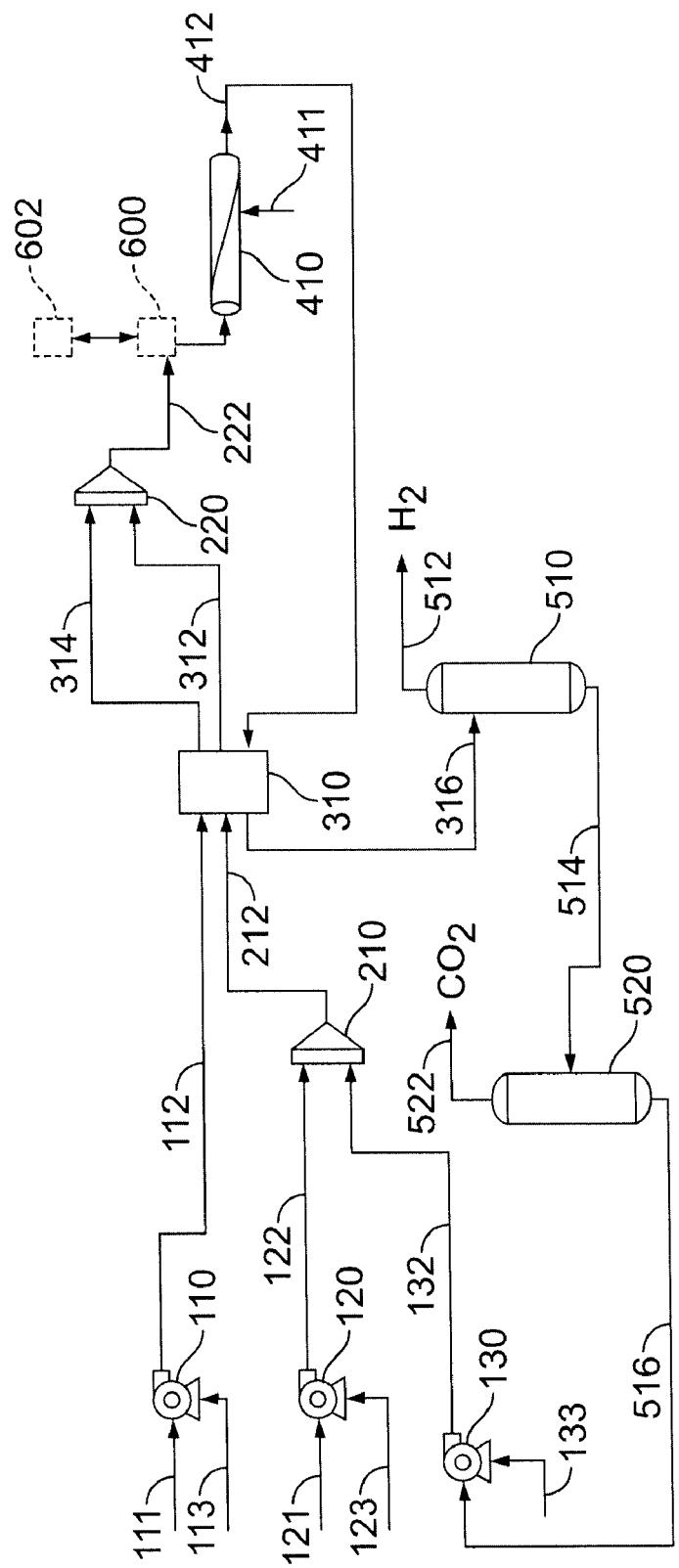
FIG. 5 is a flow diagram illustrating a system for hydrogen production suitable for use with the catalysts and method of the present invention.

A system for producing hydrogen in accordance with the present invention is illustrated in FIG. 5. In the system of FIG. 5, hydrogen separation from the reactor product stream is accomplished outside of the reactor. Liquid hydrocarbon fuel 111 and water 121 are fed into pumps 110 and 120, respectively, to increase the pressure of each from approximately 1 bar to 240 bars. Suitable pumps are known in the art and are available, for example, from Agilent Technologies, Inc. of Santa Clara, Calif. and Milton Roy of Ivyland, Pa. Another water stream from water recycle stream 516 is fed into a pump 130 to increase the pressure to 240 bars and then mixed with fresh water in a mixer 210 to form the stream 212. Both fuel 112 and water 212 streams pass through a heat exchanger 310 to increase the temperature of each to approximately 600-800° C. via heat exchange with reactor product stream 412. Stream 312, supercritical water after the heat exchanger, is mixed with fuel stream 314 in mixer 220 to form a reaction stream 222 input for reactor 410.

The product stream 412 exiting the reactor 410 is directed to the heat exchanger 310 where it heats incoming fuel and water streams 112 and 212, respectively, and then is directed into a hydrogen separator 510. Hydrogen as a product is collected from 510 and is distributed there from, as indicated at 512, for use in fuel cells or hydrogenation. The rest of the stream 514 goes to a gas separator 520 via a pressure release process. All of the product gas except hydrogen is collected in the stream 522 leaving separator 520. A stream of water 516 exits separator 520 and is recycled back to mixer 210 to mix with fresh water via pump 130.

In the flow diagram, energy is imported to the system via streams 113, 123 and 133 to power pumps 110, 120 and 130 and stream 411 to provide the heating stream for reactor 410 (as described with reference to FIGS. 1-4 for combustion in the heating stream channels) through burning residual hydrogen from a fuel cell or hydrocarbon from the gas separator 520.

In addition, a process for fuel desulphurization may optionally be included in the hydrogen generation process. The purpose of such a process is to remove sulfur compounds which can poison the catalyst in the reactor 410. A supercritical process provides a means of desulphurizing the fuel source as sulfur compounds may be separated due to unique properties achievable under supercritical conditions. More specifically, sulfur inorganic compounds normally are dissolved in water solution, but will form deposits in supercritical condition. In addition, some sulfur organic compounds form suspension in supercritical water condition. Either of these behaviors leads to the possibility of mechanically separating the sulfur from the fuel through the process of forming sulfur compounds which may be physically separated in the separator device, illustrated in phantom at 600 in FIG. 5. The separator device 600 may be, for example, a molecular sieve featuring a zeolite structure. The separator device 600 adsorbs the sulfur contamination as the fuel/reaction stream (222 in FIG. 5) flows through the device. The usual practice is to place two sieves in parallel and alternate between the process flow and regeneration. One sieve, 600 in FIG. 5, is regenerated by desorption while the process flow goes through the other sieve 602.

The supercritical system and method described above work well over a wide range of conditions and with various hydrocarbon fuel sources having a wide range of purities.

While embodiments of the invention have been shown and described, it will be apparent to those skilled in the art that changes and modifications may be made therein without departing from the spirit of the invention.

What is claimed is:

1. A system for producing hydrogen comprising;
   a) a reactor including a reaction channel adapted to receive a reaction stream including a mixture of supercritical water and a hydrocarbon fuel;
   b) a catalyst positioned in the reaction channel so that a product stream containing hydrogen is produced by a reaction in the reaction channel when the mixture is exposed to the catalyst;
   wherein the catalyst contains a catalytically active metal and a promoter in a metal format, selected from the group consisting of potassium, sodium, rubidium, lithium, cesium, beryllium, magnesium, calcium, strontium, and barium.

2. The system of claim 1 where the catalytically active metal is selected from the group consisting of nickel, platinum, rhodium, ruthenium, copper, chromium, zinc, neodymium, molybdenum, manganese, vanadium, niobium technetium, cadmium, rhenium, osmium, iridium, mercury, tungsten, cobalt, palladium, silver, and gold.

3. The system of claim 1 where the catalyst also contains a catalytically active oxide selected from the group consisting of chromium, zinc, neodymium, molybdenum, manganese, vanadium, niobium technetium, cadmium, rhenium, osmium, iridium, mercury, tungsten, cobalt, palladium, silver, and gold.

4. The system of claim 1 where the catalyst contains more than one of the said catalyst promoters.

5. The system of claim 2 where the catalyst contains more than one more than one of the said catalytically active metals.

6. The system of claim 3 where the catalyst contains more than one of the said catalytically active oxides.

7. The system of claim 1 wherein the catalyst includes a coating on the internal surfaces of the reactor channel.

8. The system of claim 1 wherein the wherein the catalyst is a packed bed catalyst.

9. The system of claim 1 wherein the catalyst is an unsupported catalyst.

10. The system of claim 1 wherein the catalyst is a supported catalyst.

11. The system of claim 10 wherein the catalyst support is an oxide selected from the group consisting of oxides of aluminum, magnesium, cerium, zirconium, lanthanum, silicon, neodymium, vanadium, titanium.

12. The system of claim 11 where the catalyst support contains more than one of the said oxides.

13. The system of claim 1 wherein the reactor comprises:
   a) a housing including a bonded stack of plates featuring passageways which define a heating stream channel and a reaction channel
   b) a heat transfer wall separating the heating stream channel and the reaction channel;
   c) said heating stream channel adapted to receive a heating stream so that heat is provided to the reaction channel through the heat transfer wall
   d) a catalyst positioned in the reaction channel and said reaction channel adapted to receive a reaction stream including a mixture of supercritical water and a hydrocarbon fuel so that hydrogen is produced in the reaction channel.

14. The system of claim 13 wherein said heating stream channel contains a combustion catalyst so that combustion occurs therein when the heating stream is received.

15. The system of claim 13 wherein the heating stream channel includes an auxiliary electric heating arrangement.

16. The system of claim 13 wherein the reaction channel is perpendicular to the heating stream channel and the hydrogen channel.

17. The system according to claim 1 further comprising a separator so that hydrogen is separated from the process stream.

18. The system of claim 17 wherein the separator includes a membrane.

19. The system of claim 18 wherein the membrane is supported on a porous plate.

20. The system of claim 18 wherein the membrane is selected from the group consisting of palladium, vanadium and alloys thereof.

21. The system of 17 wherein the separator is a component separate from the reactor.

22. The system of claim 21 wherein the separator is achieved by a pressure swing adsorption process.

23. The system of claim 21 further comprising a heat exchanger in circuit between the reactor and the separator, said heat exchanger warming the product stream from the reactor before it enters the separator.

24. The system of claim 17 wherein the separator is incorporated within the reactor.

25. The system of claim 24 wherein reactor further comprises a hydrogen channel positioned so that it is adjacent to the process channel and the separator is positioned between the reaction channel and hydrogen channel so that hydrogen from the product stream is passed through the separator into said hydrogen channel.

26. The system of claim 17 wherein the separator produces a non-hydrogen stream and further comprising a gas separator that receives the non-hydrogen stream so that a gas stream and a water stream are produced.

27. The system of claim 1 further comprising a desulphurization device having an input adapted to receive the reaction stream and an outlet in communication with the reactor so that a desulphurized reaction stream is provided to the reactor.

28. The system of claim 1 wherein the hydrocarbon fuel is a gas selected from the group consisting of natural gas, components of natural gas and other gaseous hydrocarbons.

29. The system of claim 1 wherein the hydrocarbon fuel is a liquid selected from the group consisting of gasoline, jet fuel, diesel fuel, crude oil and other liquid fuels.

30. The system of claim 1 wherein the hydrocarbon fuel is a solid selected from the group consisting of coal and biomass.

* * * * *